United States Patent
Kawai et al.

(10) Patent No.: US 7,082,349 B2
(45) Date of Patent: Jul. 25, 2006

(54) MACHINING APPARATUS FOR MACHINING A WORKPIECE TO REPRODUCE A MODEL SHAPE

(75) Inventors: Tomohiko Kawai, Yamanashi (JP); Kenzo Ebihara, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 11/075,192

(22) Filed: Mar. 9, 2005

(65) Prior Publication Data
US 2005/0203660 A1   Sep. 15, 2005

(30) Foreign Application Priority Data
Mar. 10, 2004  (JP) .............. 2004-067586

(51) Int. Cl.
*G06F 19/00*   (2006.01)
(52) U.S. Cl. ............................................. 700/161
(58) Field of Classification Search ........ 700/159–161, 700/163; 318/578; 409/80–85, 121, 124
See application file for complete search history.

(56) References Cited

U.S. PATENT DOCUMENTS

| | | | | |
|---|---|---|---|---|
| 4,063,390 A | * | 12/1977 | Chevalier ..................... | 451/42 |
| 4,215,960 A | * | 8/1980 | Tsuzuki ........................ | 409/121 |
| 4,277,880 A | * | 7/1981 | Utsumi ........................ | 483/4 |
| 5,003,153 A | * | 3/1991 | Kondo .................. | 219/121.68 |
| 5,015,130 A | * | 5/1991 | Matsuura et al. ............. | 409/80 |
| 5,180,957 A | * | 1/1993 | Matsuura et al. ............ | 318/578 |
| 5,192,472 A | * | 3/1993 | Andersson .................. | 264/40.1 |
| 5,241,485 A | * | 8/1993 | Matsuura ..................... | 700/161 |
| 5,247,233 A | * | 9/1993 | Matsuura et al. ........... | 318/570 |
| 5,274,563 A | * | 12/1993 | Matsuura et al. ........... | 700/161 |
| 5,343,402 A | * | 8/1994 | Matsuura et al. ........... | 700/161 |
| 5,550,330 A | * | 8/1996 | Matsuura et al. ......... | 178/18.02 |
| 5,652,709 A | * | 7/1997 | Andersson et al. .......... | 700/161 |
| 6,076,953 A | * | 6/2000 | Oakley ....................... | 700/195 |
| 6,905,293 B1 | * | 6/2005 | Filser et al. .................. | 409/84 |

FOREIGN PATENT DOCUMENTS

| | | |
|---|---|---|
| EP | 0357791 | 3/1990 |
| EP | 0446370 | 9/1991 |

OTHER PUBLICATIONS

Patent Abstracts of Japan, vol. 2000, No. 09, Oct. 13, 2000 for corresponding Japanese Patent No. 2000 165738 published Jun. 16, 2000.
European Search Report dated Jan. 26, 2006 for European Patent Application No. EP 05 25 1412.

* cited by examiner

*Primary Examiner*—Maria N. Von Buhr
(74) *Attorney, Agent, or Firm*—Staas & Halsey LLP

(57) ABSTRACT

A machining apparatus capable of easily machining a workpiece to reproduce a shape of a machining model or with alternation of a scale in a scanning or profiling direction. A non-contact displacement gauge is fixed to one surface of a tool rest, and a tool to the other surface. A machining model is disposed opposite to the displacement gauge, and a workpiece opposite to the tool. The displacement gauge measures distance to the machining model which is measured by using a probe and outputs an output signal. The output signal is amplified by using an amplifier to drive an actuator that projects the tool. The amplification degree of the amplifier is designed to be adjustable. By so doing, the workpiece can be machined with alternation of the scanning or profiling scale in relation to the machining model.

12 Claims, 3 Drawing Sheets

MACHINING APPARATUS FOR MACHINING A WORKPIECE TO REPRODUCE A MODEL SHAPE

BACKGROUND OF THE INVENTION

1. Field of the Invention

The present invention relates to a machining apparatus for machining according to a model of a machining shape.

2. Description of Related Art

In case that there is prepared a model of a machining shape in advance and the machining for obtaining a shape identical to the model is performed, generally a shape and dimensions of the model are measured, and based on the measurement result, a machining program is prepared. Then, according to the machining program, the machining machine is operated by program operation to carry out the machining. Especially when the shape is a curved surface or is complicated, measurement data reaches a vast amount. Therefore, the machining program is automatically prepared in most cases. If the machining program is automatically prepared, it requires a device for scanning and measuring a model shape, a device for storing measurement data, and a device for converting the measurement data into a machining program.

To automatically perform the machining in accordance with the model having a complicated shape, as mentioned above, various devices, such as the device for scanning and measuring a model shape, the device for storing measurement data, and the device for converting the measurement data into a machining program, are required, thus resulting in large-scale machining. Moreover, in case that the shape of a machining model is measured, the device for scanning and measuring a model shape has accuracy error in itself. Likewise, when the machining is actually carried out, the machining machine itself has accuracy error. Since each includes a factor of error, there is the problem that two error elements coexist and increase errors in a machining result. Furthermore, only a product that is machined in accordance with the machining model shape can be obtained.

SUMMARY OF THE INVENTION

The present invention provides a machining apparatus capable of easily machining a workpiece to accurately reproduce a shape of a machining model or with alternation of a scale in a scanning or profiling direction.

According to one aspect of the present invention, the machining apparatus machines a workpiece according to a machining model placed stationary, and comprises: a tool rest to be moved relative to the machining model and having a tool arranged displaceable and a non-contact type displacement gauge for measuring a distance to the machining model; means for electrically amplifying or reducing an amount measured by the displacement gauge while the tool rest is moved, to determine a displacing amount for displacing the tool; and displacing means for displacing the tool according to the determined displacing amount while the tool rest is moved, thereby the workpiece is machined simultaneously with the measurement of the machine tool by the displacement gauge.

According to another aspect of the present invention, the machining apparatus machines a workpiece according to a machining model and comprises: a non-contact type displacement gauge placed stationary; a tool rest to be moved relative to the displacement gauge, and having a tool arranged displaceable and the machining model mounted thereon, the display gauge measuring a distance to the machining model while the tool rest is moved; means for electrically enlarging or reducing an amount measured by the displacement gauge while the tool rest is moved, to determine a displacing amount for displacing the tool; and displacing means for displacing the tool according to the determined displacing amount while the tool rest is moved, thereby the workpiece is machined simultaneously with the measurement of the machining model by the displacement gauge.

The tool rest may be moved by a first linear driving unit to be reciprocated.

The first linear driving unit may be moved by a second linear driving unit in a direction perpendicular to a driving direction of the first driving unit, the displacement gauge may scan the machining model and the workpiece may be machined by the tool into a three-dimensional shape having the same size as the machining model in a plane perpendicular to a scanning direction of the displacement gauge.

The displacing means may displace the tool to cut the workpiece in a forward route of the reciprocating motion of the tool rest and may displace the tool not to cut the workpiece in a backward route of the reciprocating motion of the tool rest, to perform unidirectional draw-cutting.

The displacing means may comprise a piezoelectric element as an actuator.

According to the present invention, if only there is a machining model, even a complicated solid shape can be easily subjected to the automatic machining in accordance with the machining model without preparing a machining program, and machining in which the shape is reduced or increased in nano order in a scanning or profiling direction can be also realized.

DETAILED DESCRIPTION

Figure 1:
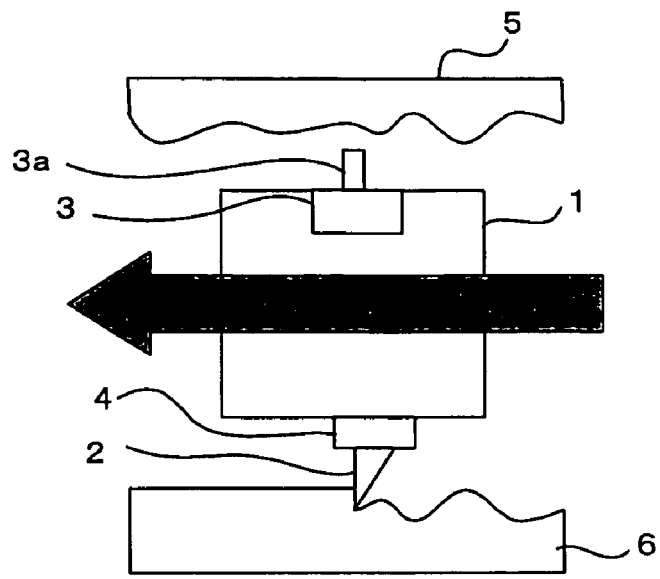
FIG. 1 is a schematic view showing a first embodiment of the present invention.

FIG. 1 is a schematic view showing a first embodiment of the present invention. In this embodiment, a tool 2 and a non-contact displacement gauge 3 are fixed to a tool rest 1. A machining model is displaced opposite to the non-contact displacement gauge 3, and a workpiece 6 opposite to the tool 2. The non-contact displacement gauge 3 measures distance between a probe 3a of the non-contact displacement gauge 3 and a machining model 5. An actuator 4 for driving the tool 2 in an axial direction thereof on the basis of a measured value is driven, and a projecting amount (displacing amount) of the tool 2 is controlled, to thereby machine an opposite face (machining face) of the workpiece 6 with respect to the tool. If the tool rest 1 is displaced from right to left, for example, as shown by an arrow in FIG. 1, distance to the machining model 5 is measured by the probe 3a of the displacement gauge 3. Based on the measurement result, a projecting amount of the tool 2 is controlled, and the workpiece 6 is subjected to draw-cut machining. A machining face (opposite face to the tool) of the workpiece 6 is machined into a shape of the machining model 5 in a height direction (vertical direction in FIG. 1) along the displacing direction of the tool rest 1.

Used as the displacement gauge 3 is a meter, such as a laser displacement gauge and an electrostatic capacity displacement gauge, which is capable of measuring a measuring object without contact. This makes it possible to measure a shape with high accuracy without vibrating the tool rest due to friction caused by contact between the probe 3*a* and the machining model 5.

Figure 2:
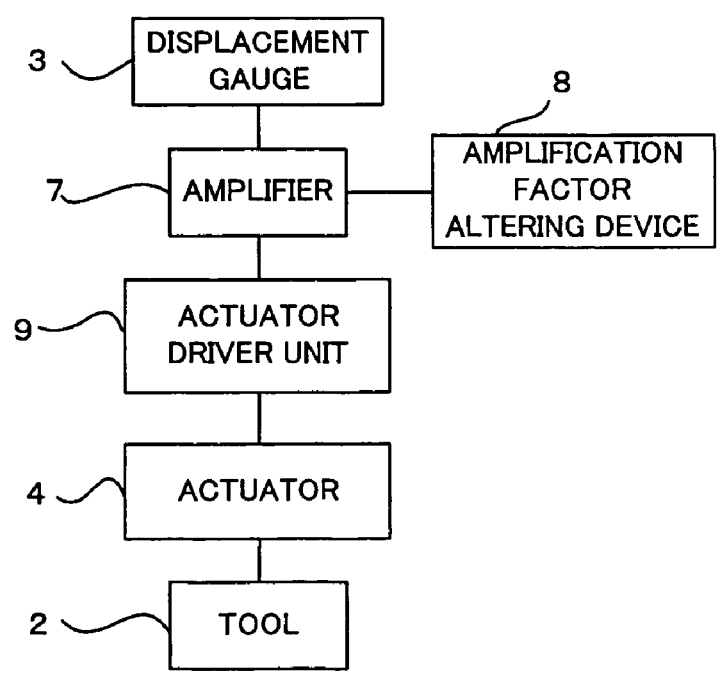
FIG. 2 is a block diagram showing a control circuit that controls a projecting amount of a tool based on a measurement result of a machining model which is obtained by a displacement gauge of the first embodiment.

FIG. 2 is a block diagram showing a control circuit in which the probe 3*a* of the non-contact displacement gauge 3 measures distance to the surface of the machining model 5 to be measured, and an output therefrom is used to control the projecting amount of the tool 2.

An analog voltage of the output of the displacement gauge 3 is amplified by an amplifier 7, and an output therefrom is inputted to an actuator driver unit 9. The amplifier 7 is so constructed as to be adjustable in amplification degree thereof by using an amplification factor-altering device 8. The actuator driver unit 9 drives an actuator 4 for driving the tool 2 and projects the tool 2 by a projecting amount according to a voltage value that has been inputted to the actuator driver unit 9. As a result, the tool is projected by the projecting amount in proportion to a measured value that has been measured by the displacement gauge 3, thereby machining the workpiece 6 into the shape identical to the machining model 5.

As illustrated in FIG. 1, if the distance to the machining model 5 which is measured by the probe 3*a* of the displacement gauge 3 is long, the projecting amount of the tool 2 is increased, which raises a cut-in amount with respect to the machining face of the workpiece 6. On the other hand, if the distance to the machining model 5 is short, the projecting amount of the tool 2 is reduced, which decreases the cut-in amount with respect to the machining face of the workpiece 6. Consequently, the machining face of the workpiece 6 is machined into the same shape as the shape of the machining model 5 in the height direction along the displacing direction of the tool rest 1.

Since the amplification factor-altering device 8 is disposed in the control circuit, if the amplification factor of the amplifier 7 is altered by using the amplification factor-altering device 8, the projecting amount of the tool 2 can be increased and reduced. Therefore, the machining shape to be given to the workpiece 6 can be enlarged or reduced or the like in relation to the shape of the machining model 5; that is, the shape of the workpiece can be machined to be different from the machining model shape in an enlargement/reduction ratio.

As the actuator 4, for example, a piezoelectric element is used. The piezoelectric element is proportional to an applied voltage in displacement amounts. Therefore, if a voltage of the output of the displacement gauge 3 is amplified by using the amplifier 7 and applied through the actuator driver unit 9 to the actuator 4 that is a piezoelectric element, the projecting amount of the tool can be easily controlled in proportion to the displacement according to the applied voltage, thus making it possible to perform the machining with nano-order accuracy.

FIG. 1 shows an example in which the draw-cut machining is carried out by using the tool 2 whose blade edge is unrotatable and fastened. It is also possible, however, to rotate the tool blade edge at a high speed, to thereby perform milling.

Figure 3:
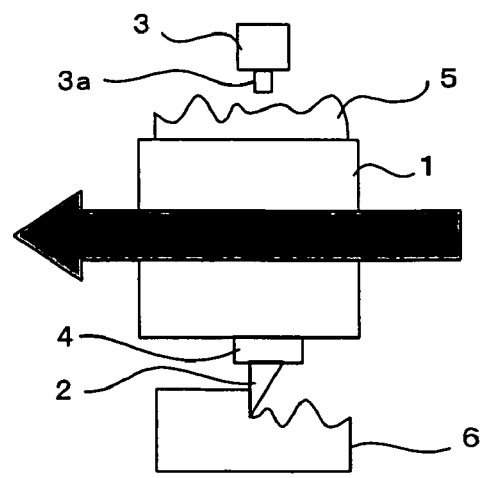
FIG. 3 is a schematic view showing a second embodiment of the present invention.

FIG. 3 is a schematic view showing a second embodiment of the present invention. According to the second embodiment, the tool 2 and the machining model 5 to be measured are fixed to the tool rest 1. The non-contact displacement gauge 3 is disposed in an outside position opposite to the machining model 5 fixed to the tool rest 1. In the same way as in the first embodiment shown in FIG. 1, according to the distance to the machining model 5 which is measured by the probe 3*a* of the displacement gauge 3, the projecting amount of the tool is controlled by using the actuator. In this respect, the second embodiment is similar to the first shown in FIG. 1, and the control circuit thereof is the same as the circuit shown in FIG. 2. In the case of the second embodiment, however, as illustrated in FIG. 3, if the tool rest 1 is displaced from right to left in the drawing as shown by an arrow, the probe 3*a* of the displacement gauge 3 scans the machining model 5 from a left end in a rightward direction to measure the distance. Based on the measurement result, the projecting amount of the tool 2 is controlled, and the workpiece 6 is subjected to the draw-cut machining from right to left. As a result, the workpiece 6 is machined into a shape that is mirror-reversed to the machining model 5.

Figure 4:
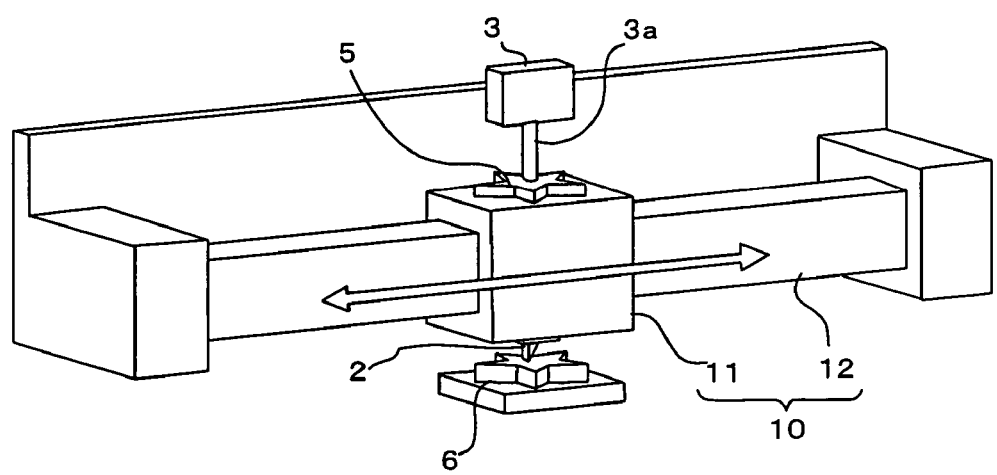
FIG. 4 is a schematic view showing a third embodiment of the present invention.

FIG. 4 is a schematic view showing a third embodiment in which a linear drive unit 10 including a slide 11 and a guide 12 is fixed to the machining apparatus of the second embodiment shown in FIG. 2. The slide 11 functions as the tool rest 1. The machining model 5 is fixed to an upper portion of the slide 11, and the tool 2 to a lower portion thereof The displacement gauge 3 is fastened in such a position that the probe 3*a* is opposite to the slide 11. The workpiece 6 is disposed in a position opposite to the tool 2.

Figure 5:
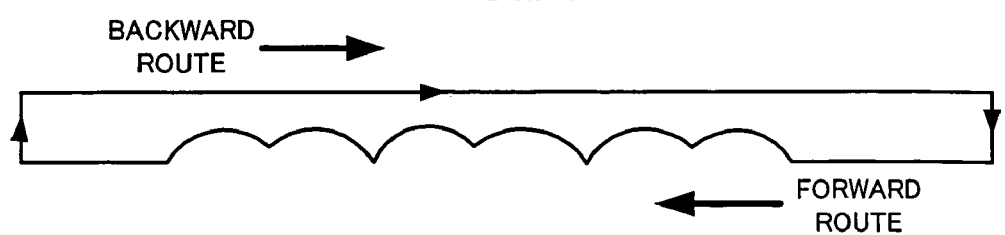
FIG. 5 is an explanatory view showing movement of a tool blade edge in the third embodiment.

The linear drive unit 10 is driven to reciprocate the slide 11 along the guide 12 as shown by an arrow in FIG. 4. Then, the projecting amount of the tool 2 is controlled according to the distance to the machining model 5 which is measured by the probe 3*a* of the displacement gauge 3, to thereby machine the workpiece 6 into a shape identical to the machining model 5 or a shape that is enlarged or reduced in a height dimension. One example of the movement of the tool 2 in relation to the reciprocating motion of the slide 11 is shown in FIG. 5. The tool 2 is projected on a forward route, and the projecting amount is changed according to the output of the displacement gauge 3. On a backward route, however, regardless of the output of the displacement gauge 3, the tool 2 is in a retreat state where the projecting amount is zero, and the machining is not performed. In other words, on the backward route, the output of the actuator driver unit 9 is brought to such a value that the projecting amount of the tool 2 is zero or is minimum and therefore disallows the machining of the workpiece 6, regardless of the input from the amplifier, to thereby drive the actuator. By so doing, one-directional draw-cut cutting machining is carried out.

In the third embodiment shown in FIG. 4, the machining is performed only to draw one straight line. However, if another slide is added as in a fourth embodiment shown in FIG. 6, it is possible to machine a solid shape in accordance with the machining model shape.

Figure 6:
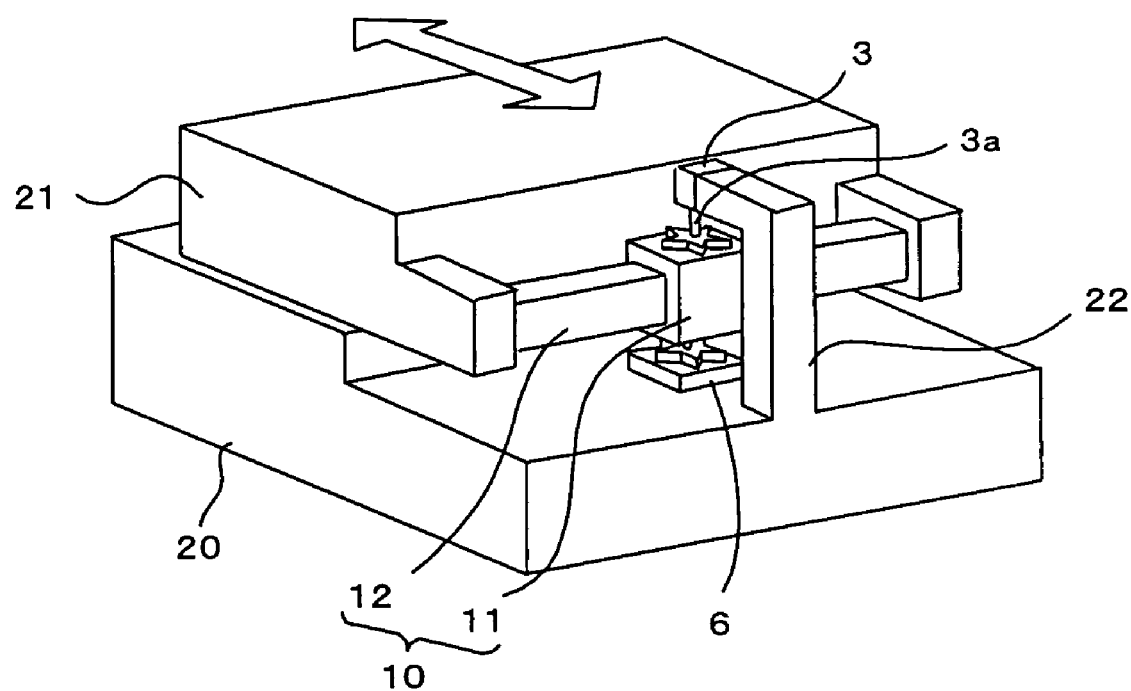
FIG. 6 is a schematic view showing a fourth embodiment of the present invention.

In FIG. 6, reference numeral 20 represents a base. A column 22 is integrally formed in the base 20, and the non-contact displacement gauge 3 is fixed to an end of the column 22. There is also arranged a second slide 21 that is displaced in relation to the base 20. Provided to the second slide 21 is the linear drive unit 10 including the first slide 11 and the guide 12 in the third embodiment shown in FIG. 4. The first slide 11 is provided with the machining model 5 in the upper portion and the tool 2 in the lower portion in the same way as in the third embodiment.

The displacing direction of the second slide 21 is orthogonal (see an arrow in FIG. 6) to that of the first slide 11, and the second slide 21 is driven by a drive unit, not shown. As a consequence, a machining machine in which the blade edge of the tool 2 is driven in an orthogonal three-axis direction is constructed. In the fourth embodiment shown in FIG. 6, the first slide 11 is lighter in weight than the second slide 21. Therefore, if the first slide 11 is reciprocated at a high speed, and the second slide 21 is driven at a speed of a fraction thereof in one direction or back and forth, the displacement gauge 3 scans the whole surface of the machining model 5 fastened to the upper portion of the first slide 11. Consequently, the workpiece 6 is machined by the tool 2 into a solid shape in accordance with the shape of the machining model 5 or a slid shape identical to the machining model 5 in a plane direction and enlarged or reduced in the height dimension.

In each of the above embodiments, practically there are limitations to resolution of a measurable shape according to a size of the probe 3a of the displacement gauge 3. Moreover, there are limitations to a shape to be machined according to the shape of the blade edge of the tool 2. Within a range of the limitations, however, no matter how complicated the shape is, each of the embodiments is capable of performing the machining in accordance with the machining model 5.

Shapes to be machined are identical in principle with respect to the displacing directions of the slides. A cutting direction of the tool 2 is determined by a ratio between the distance measured by the displacement gauge 3 and the displacement amount of the actuator that displaces the tool 2. Therefore, if the amplification degree altered by the amplification factor-altering device 8 is adjusted such that the ratio between the distance measured by the displacement gauge 3 and the displacement amount of the actuator that displaces the tool 2 is 1:1, the workpiece 6 can be machined in accordance with original dimensions of the machining model 5. If the amplification degree is adjusted such that the ratio is 10:1, the workpiece 6 is machined into a shape that is reduced to a tenth part in the height direction.

In case that the piezoelectric element is utilized as an actuator, it is possible to control extremely fine displacement. Therefore, for example, if a machining model of millimeter order is prepared, the machining model can be machined while being reduced to micron order or nano order only in a height direction by using the device of the fourth embodiment shown in FIG. 6. The piezoelectric element is fast in reaction, so that even if the slide is displaced at a high speed, it is possible to drive the blade edge in accordance with the measured shape and carry out the machining.

What is claimed is:

1. A machining apparatus for machining a workpiece according to a machining model placed stationary, comprising:
    a tool rest moveable relative to the machining model and having a tool arranged displaceable and a non-contact type displacement gauge measuring a distance to the machining model;
    means for electrically amplifying or reducing, by an amplification factor, an amount measured by said displacement gauge while said tool rest is moved, to determine a displacing amount of the tool; and
    displacing means for displacing the tool according to the determined displacing amount while the tool rest is moved, so that the workpiece is machined simultaneously with the measurement of the machine model by said displacement gauge.

2. A machining apparatus according to claim 1, wherein said tool rest is moved by a first linear driving unit to be reciprocated.

3. A machining apparatus according to claim 2, wherein said displacing means displaces the tool to cut the workpiece in a forward route of the reciprocating motion of the tool rest and displaces the tool not to cut the workpiece in a backward route of the reciprocating motion of the tool rest, to perform unidirectional draw-cutting.

4. A machining apparatus according to claim 2, wherein said first linear driving unit is moved by a second linear driving unit in a direction perpendicular to a driving direction of said first driving unit, said displacement gauge scans the machining model and the workpiece is machined by the tool into a three-dimensional shape having the same size as the machining model in a plane perpendicular to a scanning direction of said displacement gauge.

5. A machining apparatus according to claim 4, wherein said displacing means displaces the tool to cut the workpiece in a forward route of the reciprocating motion of the tool rest and displaces the tool not to cut the workpiece in a backward route of the reciprocating motion of the tool rest, to perform unidirectional draw-cutting.

6. A machining apparatus according to claim 1, wherein said displacing means comprises a piezoelectric element as an actuator.

7. A machining apparatus for machining a workpiece according to a machining model, comprising:
    a non-contact type displacement gauge placed stationary;
    a tool rest moveable relative to said displacement gauge, and having a tool arranged displaceable and the machining model mounted thereon, said displacement gauge measuring a distance to the machining model while the tool rest is moved;
    means for electrically enlarging or reducing, by an amplification factor, an amount measured by said displacement gauge while the tool rest is moved, to determine a displacing amount of the tool; and
    displacing means for displacing the tool according to the determined displacing amount while the tool rest is moved, so that the workpiece is machined simultaneously with the measurement of the machining model by said displacement gauge.

8. A machining apparatus according to claim 7, wherein said tool rest is moved by a first linear driving unit to be reciprocated.

9. A machining apparatus according to claim 8, wherein said displacing means displaces the tool to cut the workpiece in a forward route of the reciprocating motion of the tool rest and displaces the tool not to cut the workpiece in a backward route of the reciprocating motion of the tool rest, to perform unidirectional draw-cutting.

10. A machining apparatus according to claim 8, wherein said first linear driving unit is moved by a second linear driving unit in a direction perpendicular to a driving direction of said first driving unit, said displacement gauge scans the machining model and the workpiece is machined by the tool into a three-dimensional shape having the same size as the machining model in a plane perpendicular to a scanning direction of said displacement gauge.

11. A machining apparatus according to claim 10 wherein said displacing means displaces the tool to cut the workpiece in a forward route of the reciprocating motion of the tool rest and displaces the tool not to cut the workpiece in a backward route of the reciprocating motion of the tool rest, to perform unidirectional draw-cutting.

12. A machining apparatus according to claim 7, wherein said displacing means comprises a piezoelectric element as an actuator.

* * * * *

UNITED STATES PATENT AND TRADEMARK OFFICE
CERTIFICATE OF CORRECTION

PATENT NO. : 7,082,349 B2 Page 1 of 1
APPLICATION NO. : 11/075192
DATED : July 25, 2006
INVENTOR(S) : Tomohiko Kawai et al.

It is certified that error appears in the above-identified patent and that said Letters Patent is hereby corrected as shown below:

Column 4, Line 23, after "thereof" insert --.--.

Column 6, Line 57, Change "claim 10" to --claim 10,--.

Signed and Sealed this

Twelfth Day of December, 2006

JON W. DUDAS
*Director of the United States Patent and Trademark Office*